United States Patent [19]

Roth et al.

[11] 4,180,366

[45] Dec. 25, 1979

[54] LIFT ASSEMBLY FOR TRANSIT VEHICLES

[75] Inventors: Carl W. Roth, Barrington, Ill.; Hugh F. Groth, Brecksville, Ohio; G. B. Kirby Meacham, Cohasset, Mass.

[73] Assignee: Vapor Corporation, Chicago, Ill.

[21] Appl. No.: 857,745

[22] Filed: Dec. 7, 1977

[51] Int. Cl.² ............................................. B60P 1/44
[52] U.S. Cl. ............................... 414/540; 414/921; 280/166; 105/447; 254/124
[58] Field of Search .......... 214/75 H, 75 T, DIG. 13, 214/75 R; 105/447, 448; 280/163, 164, 166; 296/62; 187/18; 254/122, 124

[56] References Cited

U.S. PATENT DOCUMENTS

| | | | |
|---|---|---|---|
| 461,156 | 10/1891 | Barber | 105/447 X |
| 3,572,754 | 3/1971 | Fowler | 280/166 |
| 3,913,497 | 10/1975 | Maroshick | 105/447 |
| 4,027,807 | 6/1977 | Thorley | 214/75 R |

*Primary Examiner*—Albert J. Makay

*Attorney, Agent, or Firm*—Francis J. Lidd

[57] ABSTRACT

A lift system for a wheelchair or the like on a transit vehicle includes a stationary main frame secured within a doorway recess of the vehicle and a side frame that is movable relative to the main frame. An articulated platform including first and second steps is pivotally secured to the side frame. Scissors linkage is pivotally and slideably connected to the main frame and to the platform such that upon being actuated, the platform may be actuated from a first position defining first and second steps to a second position defining an extended platform. Thereafter the platform may be actuated in a manner such that the scissors linkage crosses over its center point to lower the platform from the floor level of the vehicle to the ground level. Once the wheelchair or the like is mounted on the platform the reverse actuation occurs and the scissors linkage again crosses over its center point to raise the platform from the ground level to the floor level.

13 Claims, 12 Drawing Figures

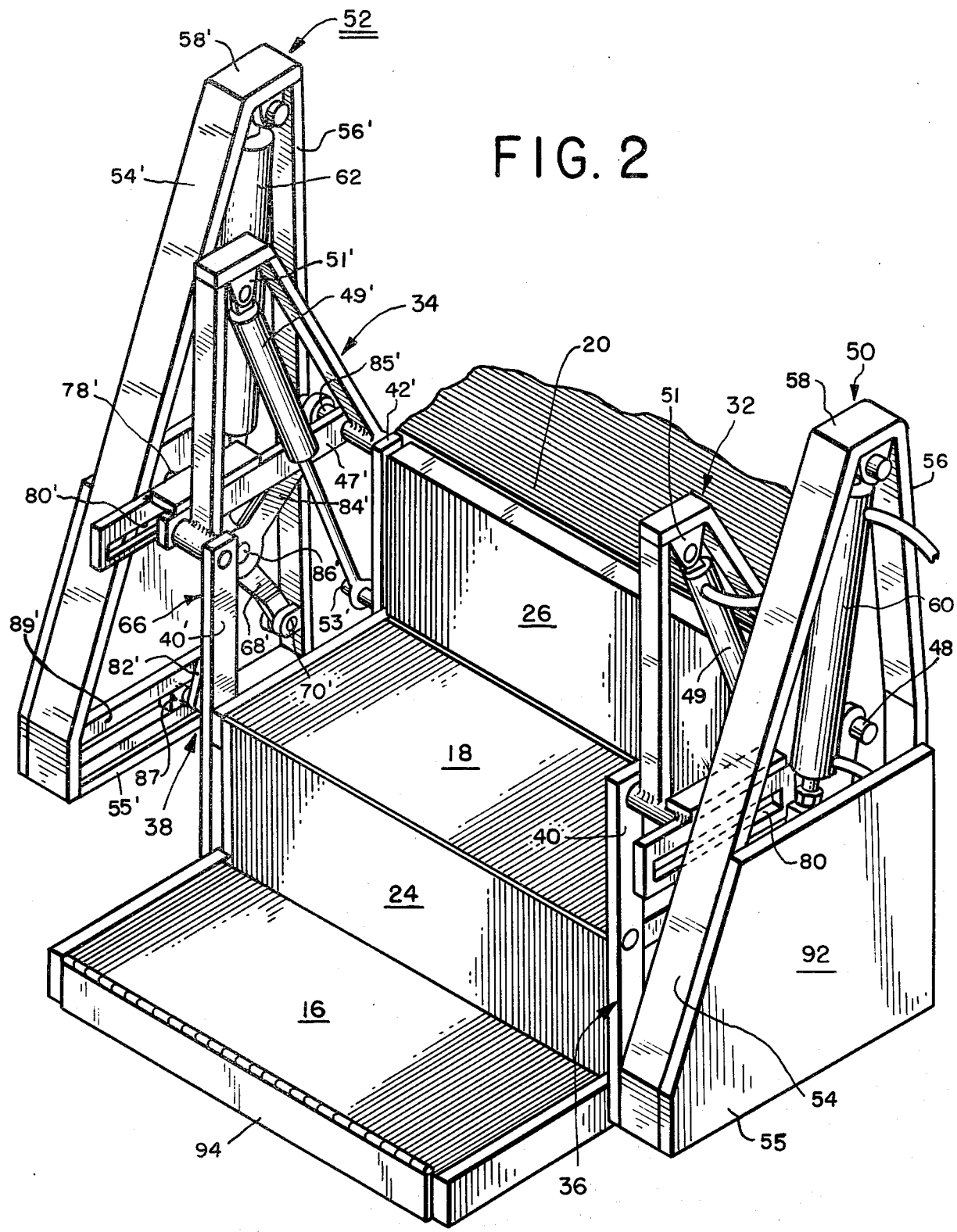

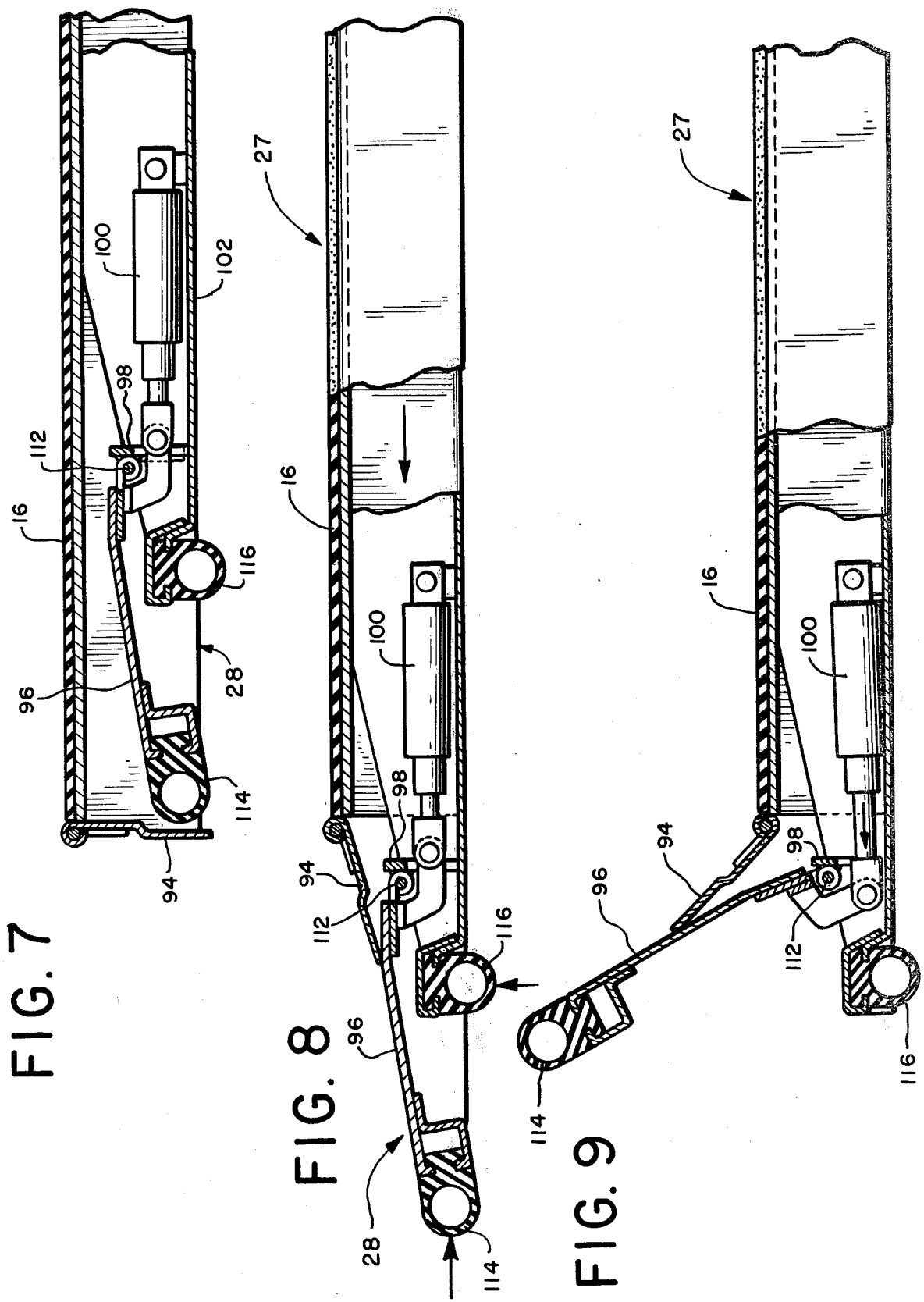

LIFT ASSEMBLY FOR TRANSIT VEHICLES

BACKGROUND OF THE INVENTION

A. Field of the Invention

The device of the present invention relates to a new and improved lift assembly for lifting wheelchairs or the like from ground level to floor level of a transit vehicle.

B. Description of the Prior Art

As transit vehicles are becoming more widely used in urban and suburban areas, the necessity for these vehicles to accomodate handicapped persons has become more widespread. To meet this need, transit vehicles require equipment capable of loading and unloading handicapped individuals in wheelchairs. Several prior art procedures have been employed to meet this need such as incorporating ramps or ground level floors on the transit vehicle. However, ramps can only be utilized in vehicles constructed so as to have a floor level relatively close to the ground; therefore, the vast majority of buses do not permit the use of a ramp.

The most desirable and least expensive procedure is a lift assembly type apparatus whereupon a platform of sufficient dimension is lowered and raised relative to the floor level of the bus and the ground or curb level. To accomplish this procedure, however, several structural members and complex hydraulic and electrical circuitry are required. One such prior art procedure employs multiple vertical cylinders as guides and a platform with rollers for rolling up and down the cylinders to raise and lower the platform. Other prior art systems raise and lower the platform by the use of complex multiple cross linkages. Each of these prior art systems requires a substantial number of components and engineering effort in addition to requiring a large space in the vehicle.

SUMMARY OF THE INVENTION

An object of the present invention is to provide a new and improved lift for transit vehicles.

Another object of the present invention is to provide a new and improved lift assembly for raising and lowering handicapped individuals in wheelchairs or similar devices relative to the floor of the vehicle.

A further object of the present invention is to provide a new and improved wheelchair lift assembly that requires a minimum number of components and that can be assembled within the doorway recess of existing transit vehicles.

The present invention is directed to a new and improved lift assembly for lifting wheelchairs and the like from ground level or some intermediate level, i.e., platform or curb to the floor level of transit vehicles and from the floor level to the ground level so as to load and unload handicapped individuals. The assembly includes a stationary main frame that is secured to the transit vehicle within a doorway recess.

Also included are first and second side frames that are mounted for movement relative to the transit vehicle. Pivotally and slideably secured to the side frame and the main frame are a pair of scissors linkages. Also pivotally secured to the side frame is an articulated platform that in a first position defines a stairway including first and second steps joined by a pivoted riser. The first step is pivotally connected by a top riser that extends along the edge of the floor of the vehicle.

An actuating device is secured to the side frames to actuate the platform from a first position defining the steps to a second position defining a platform extending from the floor of the vehicle. A second actuating device is connected to the stationary main frame and the scissors linkages, and upon actuation, causes each scissors linkage to cross over its center point to move the extended platform from the floor level of the vehicle to the ground level in order to allow the wheelchair to be moved onto the platform.

The platform also includes an end gate that is actuated from a first position within the platform to an extended position by linkages and is further actuated to an upright position after loading of the wheelchair to prevent the wheelchair from rolling off the end of the platform.

Upon the wheelchair being moved into the transit vehicle, the platform is again actuated to return to its first position defining the steps whereupon the doors of the vehicle may be closed and the vehicle moved to its next stop.

BRIEF DESCRIPTION OF THE DRAWINGS

The above and other objects and advantages and novel features of the present invention will become apparent from the following detailed description of a preferred embodiment of the invention illustrated in the accompanying drawings, wherein:

FIG. 2 is a perspective view of the lift assembly in the first position;

FIG. 7 is a view taken along line 7—7 of FIG. 3;

FIG. 8 is a view similar to FIG. 7 with the end gate extended; and

FIG. 9 is a view similar to FIG. 8 with the end gate elevated to the position to prevent a wheelchair from rolling off the platform.

DETAILED DESCRIPTION OF THE PREFERRED EMBODIMENT

Figure 1:
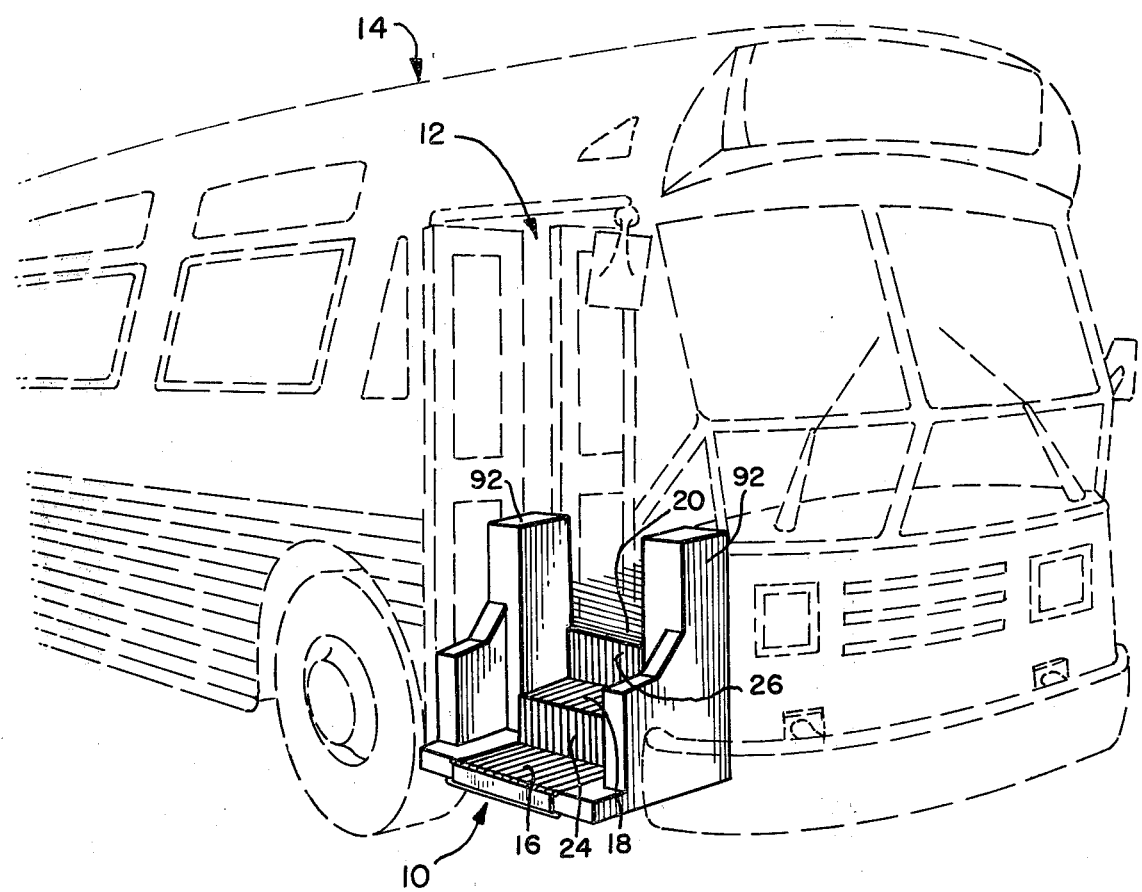
FIG. 1 is a view of the lift assembly in its first or step configuration mounted within a transit vehicle.
Figure 1A:
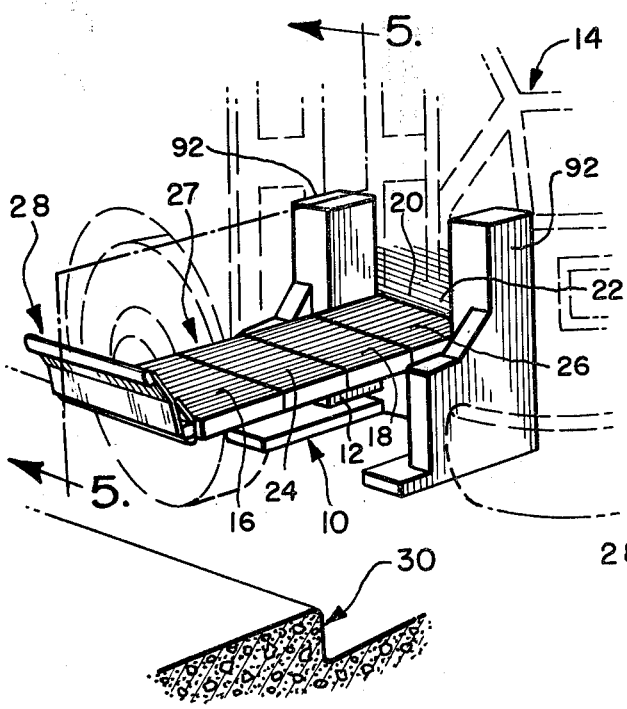
FIG. 1(a) is a view of the assembly with the platform extended at the floor level of the transit vehicle.
Figure 1B:
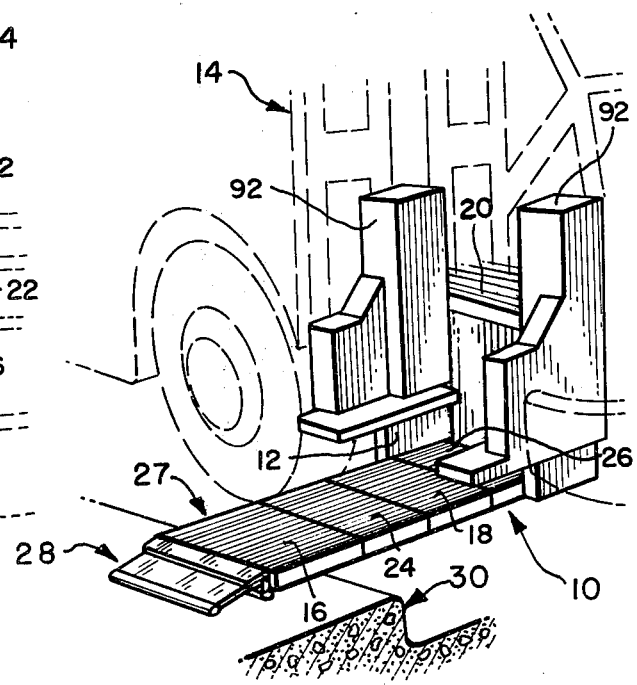
FIG. 1(b) is a view similar to 1(a) with the platform lowered to the curb or ground level.

Referring now to the drawings and initially to FIGS. 1, 1(a) and 1(b), there is illustrated a lift assembly generally designated by the reference numeral 10 that is mounted within a doorway recess 12 of a transit vehicle shown in phantom lines and generally designated by the reference numeral 14. The lift assembly 10 is intended to provide a device for loading and unloading a handicapped person in a wheelchair onto the transit vehicle 14 and when not being so used, to be in a configuration usable as steps for nonhandicapped riders.

Accordingly, the lift assembly 10 in the normal position as illustrated in FIG. 1 is in a first position defining first step 16, riser 24, second step 18 and top riser 26 that can be used to walk up to the floor level 20 of the transit vehicle 14. In a second position, the lift assembly 10 is extended to define an articulated platform (FIG. 1(a)). The steps 16 and 18 are joined by the pivoted risers 24 and step 18 is joined to the floor 20 by top riser 26, so that once the lift assembly 10 is extended to the platform configuration, a platform generally designated by the reference numeral 27 defined by the steps 16, riser 24, step and 18 and top riser 26 is provided.

In addition, an end gate generally designated by the reference numeral 28 is provided that will prevent a wheelchair on the platform 27 from rolling off the end of the platform 27.

Once the platform 27 is in the floor level extended configuration, with riser 26 contiguous to the floor 20 the platform 27 may be lowered to the ground or curb level generally designated by the reference numeral 30 in FIG. 1(b) whereupon the end gate 28 is extended outwardly from the platform 27 thus defining a ramp from the ground level 30 onto the platform 27. Once the wheelchair is positioned on the platform 27, the platform 27 may be again elevated to the floor level 20 of the transit vehicle 14 and the wheelchair may be rolled onto the vehicle 14. Thereafter, the lift assembly 10 is actuated to assume its first position defining the step 16 riser 24, step 18, and top riser 26 as illustrated in FIG. 1.

The two entry steps 16 and 18 are supported on side frames generally designated by the reference numerals 32 and 34 (FIG. 2) and are pivotally connected to the side frames 32 and 34 by two linkage members generally designated by the reference numerals 36 and 38. This employment of the parallel linkage members 36 and 38 allows the entry steps to pivot relative to the floor 20 of the vehicle 14 and the side frames 32 and 34.

For ease of understanding, only the linkage member 36 will be described since it should be understood that the linkage 38 is identical and identical members are given the same reference numbers with a prime. The linkage 36 is of a parallelogram configuration having two side links 40 and 42 joined at one end by a link 44 and at the middle or center point by a link 46. The link 40 extends along the riser 24 and is pivotally connected to the point of connection of the lower step 16 to the riser 24 and again at the point of pivotal connection of the riser 24 to the upper step 18. The link 42 is connected at one end to the link 44 and at its center point to the pivotal connection of the second step 18 to the top riser 26. The links 40 and 42 are joined at their upper end by a link 47 that is also secured to the side frame 32.

These links 40, 42, 44, 46 and 47 are interconnected to form a parallelogram linkage or the side linkage generally designated as 36 which may be pivoted principally about the upper edge of the top riser section 26 to form the flat, internally supported platform 27 when the lift assembly 10 is actuated to its second or platform configuration.

The side linkage 36 is pivoted by a platform extending cylinder 49 that is connected to the side frames 32 and 34 at the clevis 51 and to link 42 by pin 53.

The upper end of the link 40 is pivotally connected to the side frame 32 and the upper end of the link 42 is connected to a torque bar 48 that is also connected to the side frame 32 and the link 47. Due to the connection to the torque bar, both sides of the lift assembly 10 or more specifically, both of the side frames 32 and 34 are mechanically interconnected so as to synchronize the movement of the lift assembly 10 even if uneven loads are positioned on the lift assembly 10 in its platform configuration.

Figure 3:
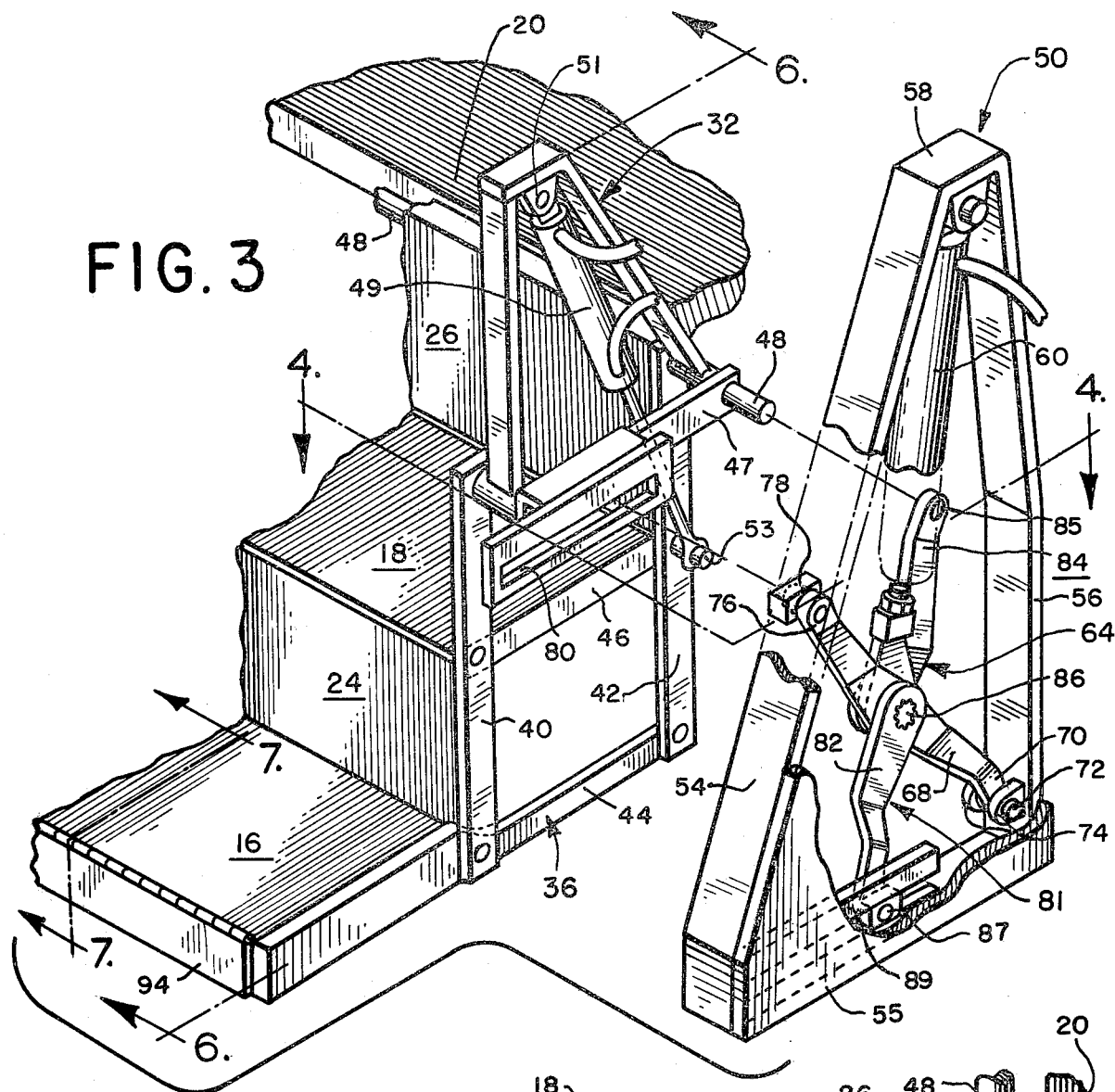
FIG. 3 is a fragmentary exploded view of the lift assembly in the position similar to FIG. 2.
Figure 4:
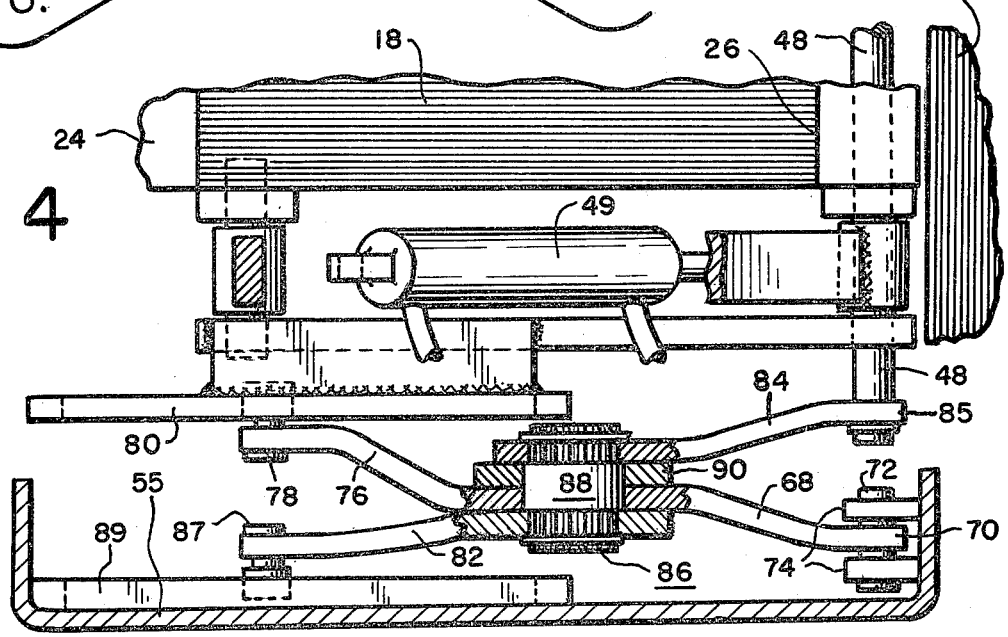
FIG. 4 is a view taken along line 4—4 of FIG. 3.

To maintain the side frames 32, the parallelogram linkage 36, the steps 16 and 18 and the risers 24 and 26 within the recess 12 of the transit vehicle 14 and to allow movement therein, there are also included stationary main frames generally designated by the reference numerals 50 and 52. The main frame 50 (FIG. 3) will be described herein although identical components are also included in the main frame 52 and are designated by same reference numerals with a prime.

The main frame 50 is of a triangular configuration having a bottom support 52 and two side supports 54 and 56 that are joined at the top by a top support 58. The main frames 50 and 52 are secured to the transit vehicle 14 within the recess 12 and are stationarily mounted thereto. The main frames 50 and 52 include main lift cylinders 60 and 62 for raising and lowering the platform 27 in its extended position. The actuation action or effect provided by the main lift cylinders 60 and 62 is mechanically connected to the platform 27 by scissors linkages generally designated by the reference numerals 64 and 66.

Due to their being identical, only the scissors linkage 64 will be described and the identical components of the scissors linkage 66 will be designated by the same reference numeral with a prime. The scissors linkage 64 includes a first, one-piece member or arm 68 that at a first end 70 is pivotally connected to the side frame member 56 of the main frame 50 by a pin 72 and a clevis 74. The opposite end 76 of the member 68 includes a pin 78 that is mounted within a slide 80 secured to the side frame 32. This provides a linearly sliding connection between the end 76 of the member 68 and the side frame 32.

The other member 81 of the scissors type linkage 64 includes a first arm or member 82 and a second arm or member 84 joined by a splined connection 86. Splined connection 86 includes a pin 88 having splines defined on the outer ends thereof and a center smooth portion that extends through an aperture defined in the member 68 such that the member 68 of the scissors linkage 64 may pivot around the pin 88. The first member 82 includes a pin 87 mounted in a slot 89 secured to the bottom support 52 of the main frame 50 thus providing a sliding connection between the scissors linkage 64 and the main frame 50.

The member 81 includes the second member or arm 84 that is secured to the torque bar 48 thus providing a connection between the scissors type linkage 64 and the side frame 32.

Figure 5:
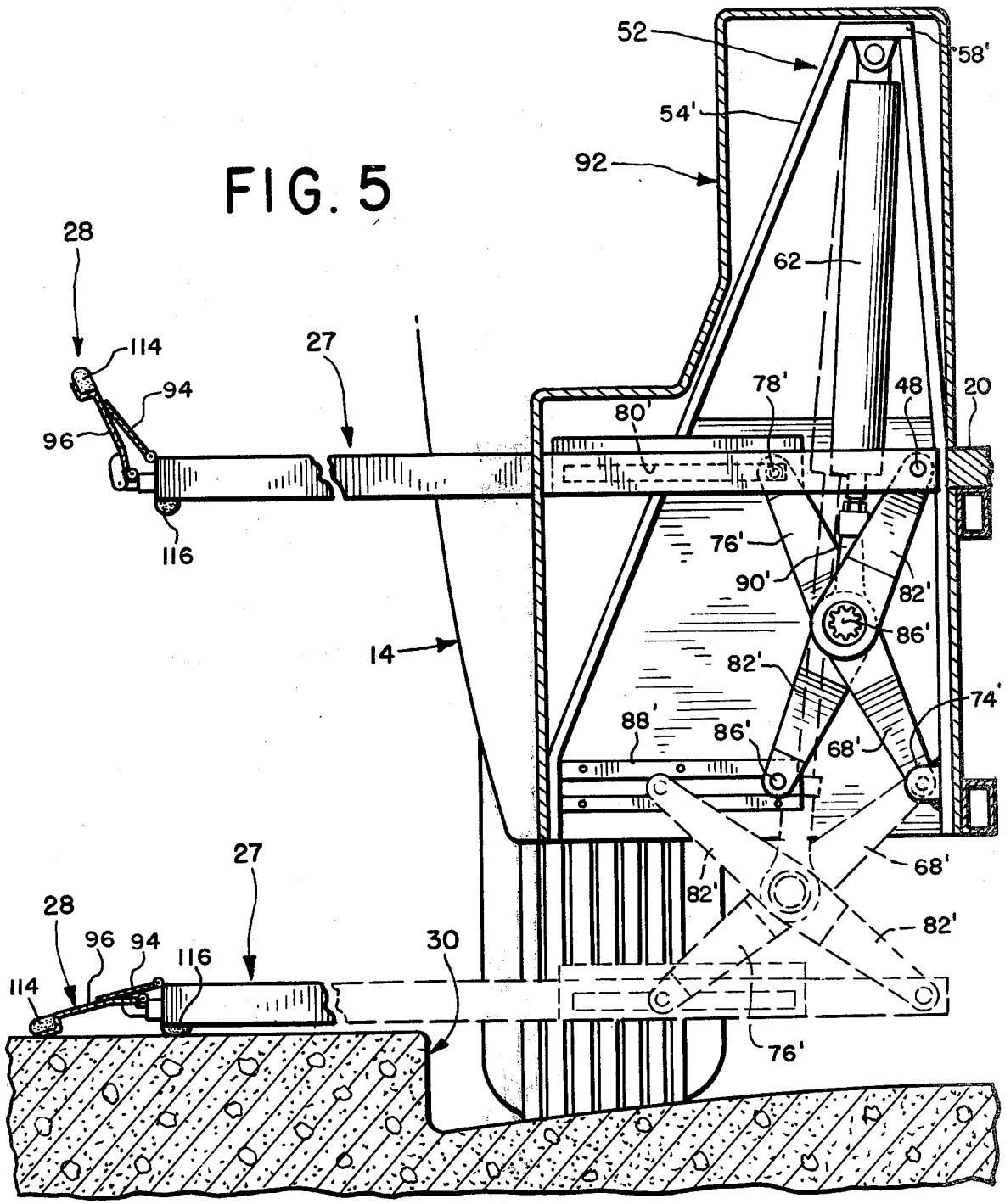
FIG. 5 is a view taken along line 5—5 of FIG. 1(a)

Connected to the pin 88 is a lift yoke 90 that is connected to the main frame cylinder 60. Although in the preferred embodiment illustrated the yoke 90 is connected to the center of the scissors linkage 64, it should be understood by those skilled in the art that this connection may be made at several other points on the scissors linkage 64 and the same result would be obtained. The result desired by the connection of cylinders 60 and 62 to the scissors type linkages 64 and 66 is to move the scissors linkages 64 and 66 through a first portion of a cycle where the end 76 of member 68 and the end 85 of member 84 cross over the center 86 of the scissors type linkage 64 and move downwardly to a position such as that illustrated by phantom lines in FIG. 5. In this lower position the platform 27 is at ground level 30. During the second portion of the cycle, the cylinder 60 lifts the scissors type linkage 64 such that the end 76 of member 68 and end 85 of the member 84 again cross over the center 86 to raise the platform 27 to the level shown in solid lines in FIG. 5.

In order to protect passengers from contacting the various components of the lift assembly resulting in harm, the main frames 50 and 52 and the side frames 32 and 34 are covered by covers generally designated by the reference numerals 92.

To better understand the structure and various components of the lift assembly 10, its operation will be described. During normal operation, the lift assembly 10 is in its step configuration best illustrated in FIGS. 1 and 2 wherein steps 16 and 18 are defined and a passenger may board or leave the vehicle 14 by walking up the steps 16 and 18 to the floor level 20. If it is desired to load a wheelchair onto the vehicle, the platform erecting cylinders 49 and 49' are retracted resulting in a pivoting of the parallelogram linkages 36 and 38 to pivot the steps 16 and 18 and the risers 24 and 26 to the platform configuration illustrated in FIG. 1(a). During the step to platform transition, both steps 16 and 18 are maintained parallel to the vehicle floor 20 in a smooth predictable motion. During this translation, the step risers 24 and 26 pivot from a vertical to a horizontal position thereby completing the platform surface.

Once the platform 27 has been defined, the main lift cylinders 60 and 62 are extended. As will be noted, the upper ends 76 and 85 of the members 68 and 84 of the scissors linkages 64 and 66 are defined at positions about half way between the transit vehicle floor 20 and the ground level 30. During the extension of the lift cylinder 60 the pin 78 moves within the slide 80 and the end 85 moves with the torque bar 48 downwardly and in an arc that imparts a linear lowering action to the platform 27. The ends 76 and 85 are passed through the center 86 of the scissors type linkage 64 to a position at approximately ground level 30. Thus the platform 27 is lowered from floor level towards the ground level 30. In effect, the platform assembly 27 is both supported and guided during translation by the scissors linkages 64 and 68 and throughout the vertical motion of the platform 27, it is maintained stable by the scissors linkages 64 and 66.

Once the wheelchair is mounted onto the platform 27, the main lift cylinders 60 and 62 are retracted and the scissors linkages 64 and 66 go through the second portion of the cycle previously described until the platform 27 reaches the floor level 20 of the transit vehicle 14 whereupon the wheelchair may be put onto the transit vehicle. Thereafter, the platform erecting cylinders 49 and 49' are extended causing the parallelogram linkages 36 and 38 to pivot and move the platform 27 from its extended configuration to its step configuration wherein the steps 16 and 18 are again defined. The doors of the transit vehicle 14 may then be closed and the vehicle 14 may move to its next stop.

In order to prevent a wheelchair mounted on the platform 27 from rolling off the end, a lift gate generally designated by the reference numeral 28 and illustrated in FIGS. 1(a) and 1(b) and in more detail in FIGS. 5-9 is employed. With reference now to FIG. 7, the lift gate 28 generally designated by the reference numeral 28 is positioned within and under the lower step 16 and is hidden from view from the front of the step 16 by a pivoted cover 94. The lift gate 28 includes first 96 and second 98 frame members that are connected to a gate cylinder 100 and a sliding frame 102.

Figure 6:
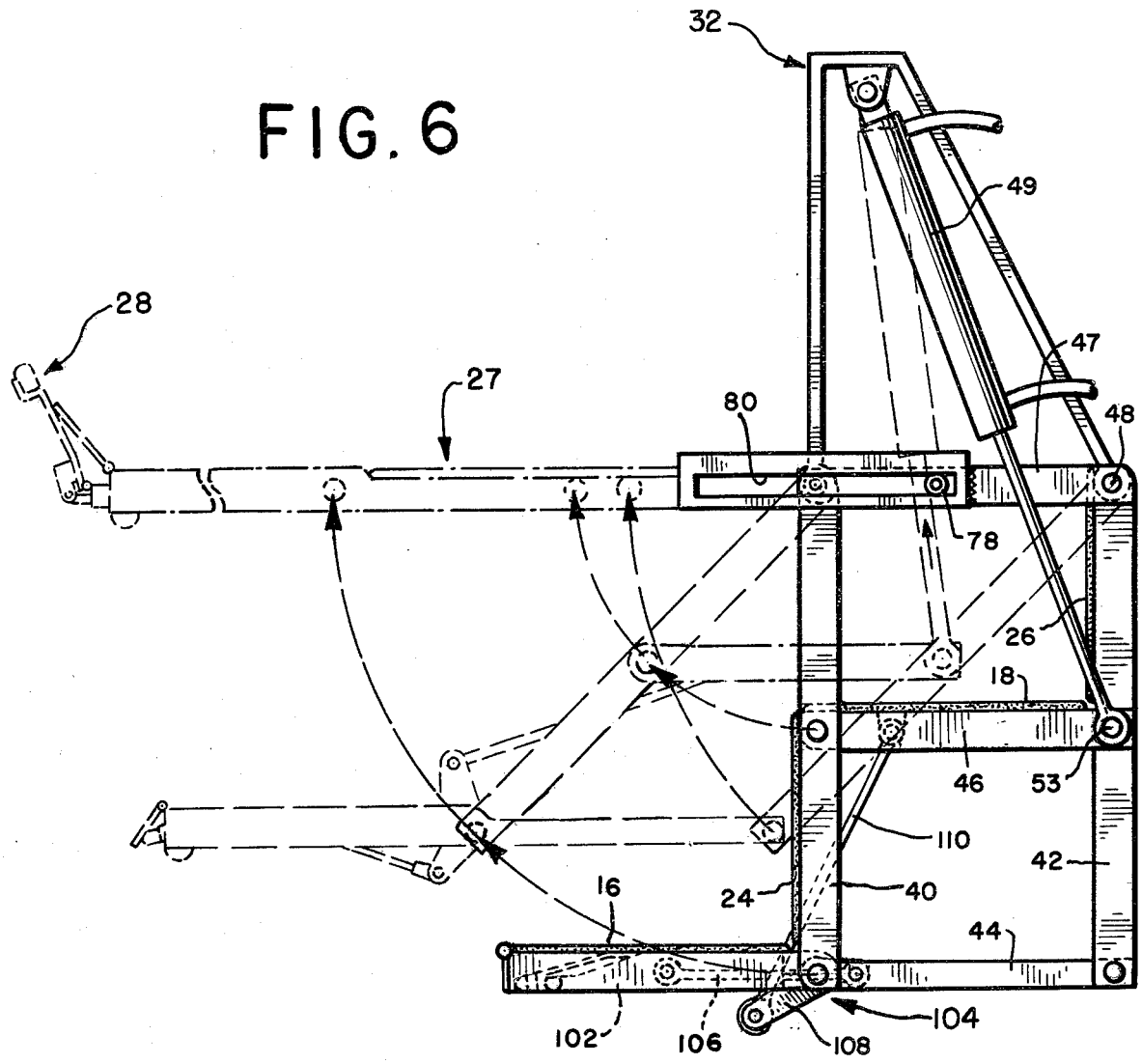
FIG. 6 is a view taken along line 6—6 of FIG. 3.

The frame 102 is moved from beneath the lower step 16 upon actuation of the lift assembly 10 from the first step configuration position to the second platform configuration position (FIG. 6). This actuation of the gate 28 is accomplished by a linkage and bell crank assembly generally designated by the reference numeral 104 (FIGS. 6 and 6(a)). The assembly 104 includes a first link 106 pivotally connected at one end to the slideable frame 102 and at the other end to the longer arm of a bell crank 108. The bell crank 108 is pivotally connected to the parallelogram linkage 36 at link 40. Also included in the assembly 104 is a second link 110 pivotally connected at one end to the underside of step 18 and at another end to the short arm of the bell crank 108.

Figure 6A:
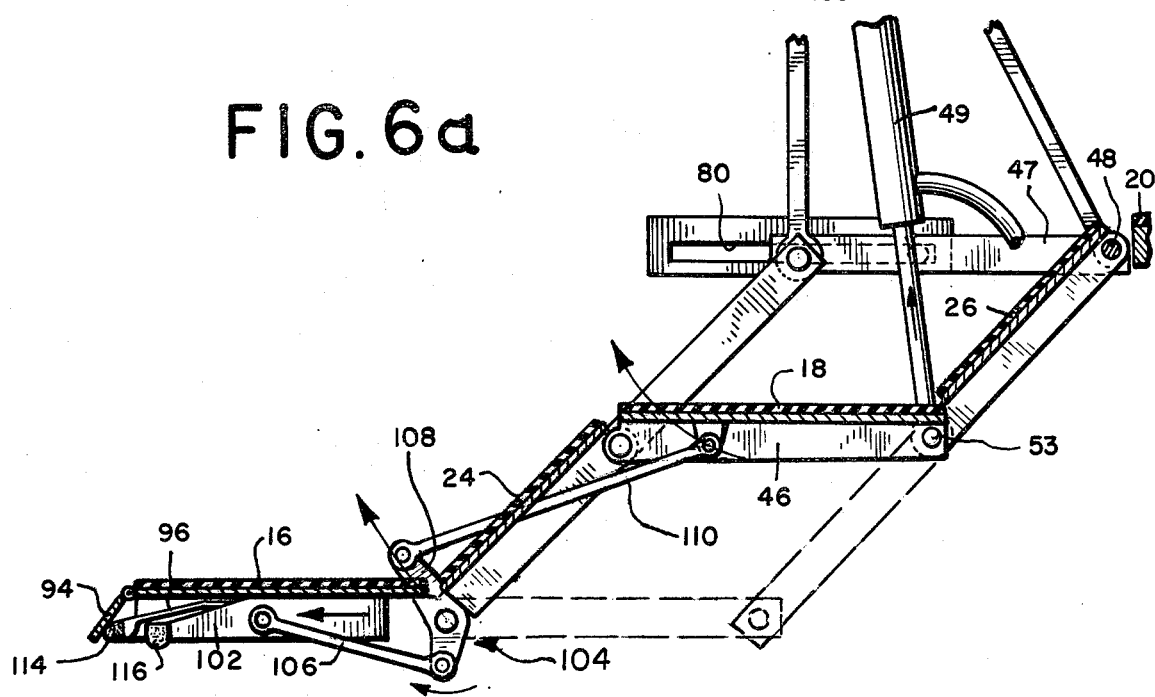
FIG. 6(a) is a view of the linkage connected to the end gate.

Accordingly, as the lift assembly 10 is actuated from the first step position to the second platform position, the linkage assembly 104 is actuated such that the bell crank 108 is pivoted in a clockwise rotational movement as illustrated in FIG. 6(a) causing the link 106 to push the slideable frame 102 outwardly from beneath the step 16 to the position best illustrated in FIG. 8. The platform 27 is then lowered and the frame 96 serves as a ramp such that the wheelchair may be rolled over the frame 96, and the cover 94 onto the platform 27.

Once this is accomplished, the cylinder 100 may be extended causing the frame 96 to pivot about a pin 112 at the point of connection of the frames 96 and 98 to an elevated position illustrated in FIG. 9. In this position, the frame 96 prevents the wheelchair from rolling off the end of the platform 27 as the platform 27 is elevated to the floor level 20 of the transit vehicle. Once the wheelchair has been moved from the platform 27 onto the vehicle 14, the cylinder 100 can be retracted moving the frame member 96 from the position illustrated in FIG. 8 to the position illustrated in FIG. 9. The platform erecting cylinders 49 and 49' may then be actuated moving the platform 27 to the first step configuration and as this occurs, the linkage assembly 104 retracts the frame 102 and thus the gate 28 to the position beneath the step 16.

It may also be desired to stop the downward movement of the assembly 10 when the platform 27 engages the ground or to stop the movement of the assembly from the first to the second position so as to prevent damage to the structure or harm an individual. Accordingly, two sensitive edges 114 and 116 are provided. The sensitive edge 114 is connected to the outer end of frame member 96 and the sensitive edge 116 is connected at the outer end of the frame member 98. The sensitive edges 114 and 116 utilize a contour rubber edge containing a sealed chamber at ambient air pressure. The chambers in the edges 114 and 116 are connected by a short length of flexible tubing (not shown) to a pressure wave type switch of high sensitivity (not shown). If an obstruction is encountered by either of the sensitive edges 114 and 116, the rubber edges 114 and 116 will be momentarily deflected creating a pressure wave which is transmitted by way of the flexible tubing to the switch. The pressure wave deflects the switch's diaphragm momentarily closing electrical contacts and thus closing or disconnecting the control system to immediately stop the motion of the platform 27 and hold the platform 27 in that position until the driver of the vehicle 14 restarts the operation.

The sensitive edge 114 is normally employed to sense any obstructions during the extension of the lift assembly from the first step position to the second platform configuration and the sensitive edge 116 is normally employed to sense obstructions during the lowering of the platform 27 to the ground level.

It may be also desired to employ sealed electrical switches to detect the fully stowed steps 16 and 18, the proper fully up position of the scissors linkages 64 and 66 and the fully erected platform 27 and the fully erected end gate 28. These switches may serve to stop each respective motion at its completion and further provide an interlocking of functions to ensure proper sequence and safe lift usage. Moreover, all horizontal surfaces of the platform 27 may be covered with a heavy duty slip resistant composite rubber treads to prevent slipping.

While only a single embodiment of the present invention has been shown, it will be understood that various changes and modifications may occur to those skilled in the art and it is contemplated by the appended claims to cover all such changes and modifications as fall within the true spirit and scope of the present invention.

What is claimed as new and desired to be secured by Letters Patent of the United States is:

1. In a vehicle, a lift assembly for lifting wheelchairs and the like from ground level to a floor level of the vehicle comprising:
   a main frame secured to a doorway of said vehicle that defines an envelope in which said lift assembly is positioned;
   means defining at least first and second steps including pivot means for pivotally connecting said first and second steps;
   at least one side linkage member pivotally secured to said first and second steps;
   at least one side frame member to which said linkage member is pivotally connected and supported thereby;
   at least one scissors linkage member pivotally and slideably connected to said main frame and to said side frame member;
   means for pivoting said step means relative to said side frame member to form a platform extending from said vehicle; and
   means for pivoting said scissors linkage to and through the center of said scissors linkage to reverse the position of said scissors linkage and move said side frame member and said platform from said floor level to said ground level.

2. The lift assembly set forth in claim 1 wherein said scissors linkage includes first and second lever members pivotally connected at the center of each, said first and second lever members each including first and second ends, a first slide secured to said side frame member and a second slide secured to said main frame, said first end of said first lever member pivotally coupled to said side member, said second end of said first lever member slideably mounted in said second slide, said first end of said second lever member slideably mounted in said first slide, said second end pivotally secured to said main frame.

3. The lift assembly set forth in claim 2 wherein said pivoting means for said scissors linkage is pivotally coupled to said center of said scissors linkage and to said main frame.

4. The lift assembly set forth in claim 1 further comprising a torque bar secured to said step means and including at least one end secured to said first end of said first lever member of said scissors linkage.

5. The lift assembly set forth in claim 1 further comprising a gate mounted at the end of said platform and gate actuating linkage means for actuating said gate to a first position upon formation of said platform and to a second position upon actuation of said step means from said platform to said position defining said steps.

6. The lift assembly set forth in claim 5 further comprising sensitive edge means defined on said gate for terminating the actuation of one of said platform and said gate upon engagement with an object.

7. In combination
   a transit vehicle including a door and a recess defined in said vehicle adjacent said door; and
   a lift assembly mounted in said recess defining steps in a first position and a lift platform in a second position for lifting wheelchairs and the like from a ground level position to the level of a floor of said vehicle;
   said lift assembly comprising:
   articulated platform means defining in a first position steps in said recess and in a second position a platform;
   platform actuating means for actuating said platform means from said first position to said second position and from said second position to said first position; and
   platform moving means for moving said platform from said floor level to said ground level and from said ground level to said floor level, said moving means including at least one scissors linkage member, said scissors linkage including first and second arms pivotally joined at the center point of each in a crossing configuration, each said first and second arm including one end stationarily and pivotally secured relative to said vehicle and said platform means, and a second end slideably secured relative to said vehicle and said platform means to allow said scissors linkage arms to cross over the center pivot point upon actuation of said platfrom means from said floor level position to said ground level position and from said ground level position to said floor level position.

8. The combination set forth in claim 7 further comprising gate means for preventing said wheelchair or the like from rolling off said platform, and gate actuating linkage means for actuating said gate upon actuating of said platform means from said first to said second position.

9. The combination set forth in claim 7 said platform means including a first and second step, a first riser pivotally connected to said first step and a second riser pivotally connected to said first and second steps.

10. The combination set forth in claim 9 further comprising at least one side link assembly pivotally coupled to said first and second steps and said first and second risers, said platform moving means including at least one cylinder coupled to said side link assembly to move said steps simultaneously.

11. In a transit vehicle including a body with a floor, a door and a doorway recess defined in said body the improvement comprising:
   a lift assembly including a main frame stationarily securing to said vehicle in said recess, a main frame, articulated step means for defining steps in a first position and an extended platform in a second position, said step means including at least first and second steps, a first riser pivotally connecting said first and second steps and a second riser pivotally connected to said second step, a side frame, a torque bar connected to said side frame and said second riser, a parallelogram linkage pivotally connected to said step means and said torque bar, and scissors linkage mechanically coupling said main frame to said side frame, said scissors linkage including a first member with a first end pivotally coupled to said main frame and a second end slideably coupled to said main frame and a second member with a first end slideably coupled to said main frame and a second end pivotally coupled to said side frame; and first actuating means for moving said scissors linkage overcenter to raise and lower said platform and second actuating means for actuating said step means from said first to said second position and from said second to said first position.

12. The improvement set forth in claim 11 further comprising end gate means for preventing the rolling off of an object on said platform and linkage means coupled to said end gate means and said step means for actuating said end gate means upon actuation of said step means from said first position to said second position.

13. The improvement set forth in claim 12 further comprising means on said end gate means for terminating the actuation of said gate means and said step means upon engagement with an object.

* * * * *